UNITED STATES PATENT OFFICE.

MORDUCH L. KAPLAN, OF BROOKLYN, NEW YORK.

PROCESS OF PREPARING MANGANESE PEROXID.

1,293,461.      Specification of Letters Patent.      Patented Feb. 4, 1919.

No Drawing.      Application filed May 11, 1917. Serial No. 167,873.

*To all whom it may concern:*

Be it known that I, MORDUCH L. KAPLAN, a citizen of the United States, and a resident of Brooklyn, in the county of Kings and State of New York, have invented certain new and useful Improvements in Processes of Preparing Manganese Peroxid, of which the following is a specification.

Manganese dioxid, on account of its oxidizing properties is a widely used substance, and its most common use is for depolarizing purposes in the Le Clanché cell. It is found in nature in the form of a mineral, pyrolusite. For its artificial preparation two reactions are known: (1) The decomposition of manganese-nitrate at about 170° centigrade according to the equation:

$$Mn(NO_3)_2 = MnO_2 + 2NO_2$$

(2) The oxidation of manganese carbonate by oxygen of the air at about 300° centigrade.

$$2MnCO_3 + O_2 = 2MnO_2 + 2CO_2$$

The first of these reactions, though leading to a highly pure product, and though inexpensive, since nitric acid could be regenerated from $NO_2$ by combining the latter with the oxygen of the air and water:

$$2NO_2 + O + H_2O = 2HNO_3,$$

has found very little application, and the main reason for this is the low melting point of the nitrate, which causes the product to appear in the shape of a hard solid mass, which mass, even after pulverization, was found inferior to the powdered mineral. In order to make this reaction available for the purpose of making a battery electrode, it was proposed in U. S. Patents 1,160,999 and 1,170,819 to mix with the nitrate the conducting material, such as carbon or graphite used in conjunction with the depolarizer in making up battery electrodes, before decomposing the nitrate and changing it to dioxid. This way of working, on account of increasing the active surface to a higher degree than it is possible through mere mechanical pulverization, has yielded excellent battery electrodes while working on a laboratory scale but could not thus far be used on a larger scale. The reason for the difficulties encountered in applying this process in the manufacture of dry cells is the comparatively small quantity of solids which the necessary proportion of depolarizer to conducting material permits to introduce in the liquid nitrate; the mixture remaining therefore in a liquid state and in order to insure an even distribution of conducting material all through the mixture, the same has to be stirred during decomposition. This stirring operation during the evolution of $NO_2$, a gas attacking nearly all metals, is the main obstacle to the use of the above process since it necessitates the use of special apparatus constructed from special materials.

As to the second reaction, the oxidation of manganese carbonate by the oxygen of the air, though it has been found suitable for manufacturing on a large scale, still has the disadvantage that it cannot conveniently be carried to completion. This is due to the high resistance presented by the pores of the particles of the carbonate to the penetration by gases, and for this reason, the products of the air oxidation contain always a few per cent. of $CO_2$ combined with $MnO$. This last mentioned impurity is in many cases highly undesirable, especially so when the product is to be used for depolarizing purposes, since the presence of carbonate impairs the shelf life of the cell. As the removal of the carbonate by treatment with acid solutions was found impracticable for many reasons, chief among which are, a decreased yield in manganese product and the tenacity with which acids are retained by manganese dioxid, it was proposed in U. S. Patent 1,078,788 to oxidize these small quantities of carbonate by an aqueous solution of an oxidizing agent such as $KMnO_4$.

This method, yielding as it does a highly efficient depolarizer, still leaves room for further improvement, since the treatment with an expensive chemical such as $KMnO_4$ adds to the cost of the product, secondly it introduces a few per cent. of manganese dioxid of a different origin, viz, from the reduction of $KMnO_4$ and as this reduction, as a general experience, yields a highly hydrated manganese, the resulting products of the permanganate treatment are therefore not entirely free from hydrates which might cause local action in a cell where such products have been introduced for depolarizing purposes; but the main and most weighty objection to the above-mentioned process is, since it does not include any stage for removing impurities, it is capable of giving good results only when working up a carbonate of a high degree of purity which property is seldom possessed by the commercial article.

I have invented a new method of preparing artificial manganese of a high degree of purity and at an exceedingly small cost, which method consists in combining the two reactions mentioned above in the following manner:

Manganese carbonate heated above 300° centigrade is exposed to the action of hot air for a period of a few hours, which treatment yields usually a product containing more than 70% $MnO_2$. This product after cooling is moistened with from 10 to 20% nitric acid, figured on weight of product to be treated and according to contents of $MnO_2$, and, in order to insure equal distribution of and penetration by the acid, water is added in sufficient quantity to make the mass appear damp all the way through. This damp powder placed in an acid resisting retort or chamber with facilities for heating, is heated to drive off water and the excess of acid and the temperature is then gradually raised to decompose the manganese nitrate formed previously. As the decomposition point of nearly all nitrates lies much higher than that of manganese nitrate, all acid-soluble-impurities contained originally in the carbonate are now present in the form of soluble nitrates which are easily removed by extraction with water. The resulting product after filtering and drying at low temperatures consists of a fine, dense, gray-colored powder resembling in appearance most closely the powdered mineral but is far superior to the latter in purity and efficiency especially as a depolarizer. Instead of treating the carbonate with air alone, it can be treated with air in the presence of a catalytic agent such as an oxid of nitrogen, in which case the period of the air treatment is considerably shortened and the temperature may be kept lower.

My invention is equally applicable for the treatment of manganese peroxid whether the same be artificial or mineral, for the removal therefrom of basic constituents or impurities.

What I claim as my invention and desire to secure by Letters Patent, is:

1. A method of preparing artificial manganese peroxid, which comprises the heating of manganese carbonate above 300° centigrade, exposing the same to hot air to yield a product containing $MnO_2$, then moistening this product with a liquid containing nitric acid, heating the resultant damp powder to drive off moisture and excess of acid, then increasing the temperature to decompose the manganese nitrate previously formed, extracting the residual nitrates with water, and then filtering and drying the material, the resultant product being a fine dense powder.

2. A method of preparing artificial manganese peroxid, which comprises the heating of manganese carbonate above 300° centigrade, exposing the same to hot air to yield a product containing $MnO_2$, moistening this product with nitric acid with the addition of water in sufficient quantity to insure proper distribution of the acid and the dampening of the mass throughout, heating the resultant damp powder to drive off moisture and excess of acid, then increasing the temperature to decompose the manganese nitrate previously formed, extracting the residual nitrates with water, and then filtering and drying the material, the resultant product being a fine dense powder.

3. A method of preparing artificial manganese peroxid, which comprises the heating of manganese carbonate, exposing the same to hot air in the presence of a catalytic agent to yield a product containing $MnO_2$, moistening this product with a liquid containing nitric acid, heating the resultant damp powder to drive off moisture and excess of acid, then increasing the temperature to decompose the manganese nitrate previously formed, extracting the residual nitrates with water, and then filtering and drying the material, the resultant product being a fine dense powder.

4. A method of preparing artificial manganese peroxid, which comprises the heating of manganese carbonate, exposing the same to hot air in the presence of an oxid of nitrogen to yield a product containing $MnO_2$, moistening this product with a liquid containing nitric acid, heating the resultant damp powder to drive off moisture and excess of acid, then increasing the temperature to decompose the manganese nitrate previously formed, extracting the residual nitrates with water, and then filtering and drying the material, the resultant product being a fine dense powder.

5. A method of preparing artificial manganese peroxid, which comprises the heating of manganese carbonate, treating the same to yield a product containing $MnO_2$, then applying nitric acid thereto, heating the resultant powder to dry the same and drive off excess of acid and decompose the manganese nitrate then present.

6. A method of preparing artificial manganese peroxid, which comprises the heating of manganese carbonate above 300° centigrade, exposing the same to hot air to yield a product containing $MnO_2$, moistening this product with nitric acid with the addition of water in sufficient quantity to insure proper distribution of the acid and the dampening of the mass throughout, heating the resulting powder to dry the same and drive off excess of acid and decompose the manganese nitrate then present.

7. A method of preparing artificial manganese peroxid, which comprises the heating of manganese carbonate, exposing the same to hot air in the presence of a catalytic agent to yield a product containing $MnO_2$, moistening this product with a liquid containing nitric acid, heating the resulting powder to dry the same and drive off excess of acid and decompose the manganese nitrate then present.

8. A method of preparing artificial manganese peroxid, which comprises the heating of manganese carbonate, exposing the same to hot air in the presence of an oxid of nitrogen to yield a product containing $MnO_2$, moistening this product with a liquid containing nitric acid, heating the resulting powder to dry the same and drive off excess of acid and decompose the manganese nitrate then present.

9. A method of treating manganese peroxid for the removal therefrom of basic impurities and constituents which consists in moistening the manganese peroxid with a liquid containing sufficient nitric acid to bind such impurities and constituents to the acid, heating the resulting damp powder to dry the same and decompose the manganese nitrate formed, and removing the residual nitrates.

Signed at New York city, in the county of New York and State of New York, this 10th day of May, A. D. 1917.

MORDUCH L. KAPLAN.

Witnesses:
 ARTHUR MARION,
 CHAS. C. GILL.